United States Patent [19]

Duyvesteyn et al.

[11] Patent Number: 4,610,722
[45] Date of Patent: Sep. 9, 1986

[54] PROCESS FOR METAL RECOVERY FROM STEEL PLANT DUST

[75] Inventors: Willem P. C. Duyvesteyn, Benthuisen, Netherlands; Robert F. Hogsett, Arvada, Colo.

[73] Assignee: AMAX Inc., Greenwich, Conn.

[21] Appl. No.: 696,977

[22] Filed: Jan. 31, 1985

[51] Int. Cl.$^4$ .............................................. C22B 3/00
[52] U.S. Cl. .................................. 75/97 A; 204/114; 75/101 R; 75/108; 75/109; 75/114; 75/115; 75/120; 75/121; 423/53; 423/91; 423/94; 423/95; 423/98; 423/101; 423/103; 423/109; 423/122; 423/126; 423/128; 423/132; 423/146; 423/147; 423/150; 423/158; 423/163; 423/166; 423/197; 423/199
[58] Field of Search .................. 423/539, 891, 94, 108, 423/95, 101, 103, 109, 122, 106, 126, 128, 131, 132, 147, 150, 158, 146, 163, 166, 197, 199; 75/97 A, 111, 101 R, 115, 108, 120, 121; 204/114

[56] References Cited
U.S. PATENT DOCUMENTS

| 2,264,337 | 12/1941 | Seguine et al. | 423/109 |
| 3,375,069 | 7/1965 | Duval | 423/106 |
| 4,124,462 | 11/1978 | Reinhardt et al. | 423/109 |

Primary Examiner—John Doll
Assistant Examiner—Robert L. Stoll
Attorney, Agent, or Firm—Michael A. Ciomek; Eugene J. Kalil

[57] ABSTRACT

A process is provided for hydrometallurgical processing of steel plant dusts containing cadmium, lead, zinc, and iron values, along with impurities such as chloride and fluoride salts of sodium, potassium, magnesium, etc. The first step in the process involves leaching the dust in a mixed sulfate-chloride medium that dissolves most of the zinc and cadmium. Any iron and aluminum dissolved in this step is precipitated by oxidation and neutralization. Zinc is recovered from the resulting solution by solvent extraction which provides a raffinate which is recycled to the leaching step with a bleed stream also provided for recovery of cadmium and removal of other impurities from the circuit. The lead sulfate residue from the leaching step is leached with caustic soda, and zinc dust is used to cement the lead out from the caustic solution, which then joins the main solution for zinc recovery. The residue from the lead leaching step is mixed with iron-aluminum oxide precipitate and agglomerated into pellets using cement. These pellets can be charged into steel furnaces for iron recovery or stored as a nontoxic waste.

9 Claims, 1 Drawing Figure

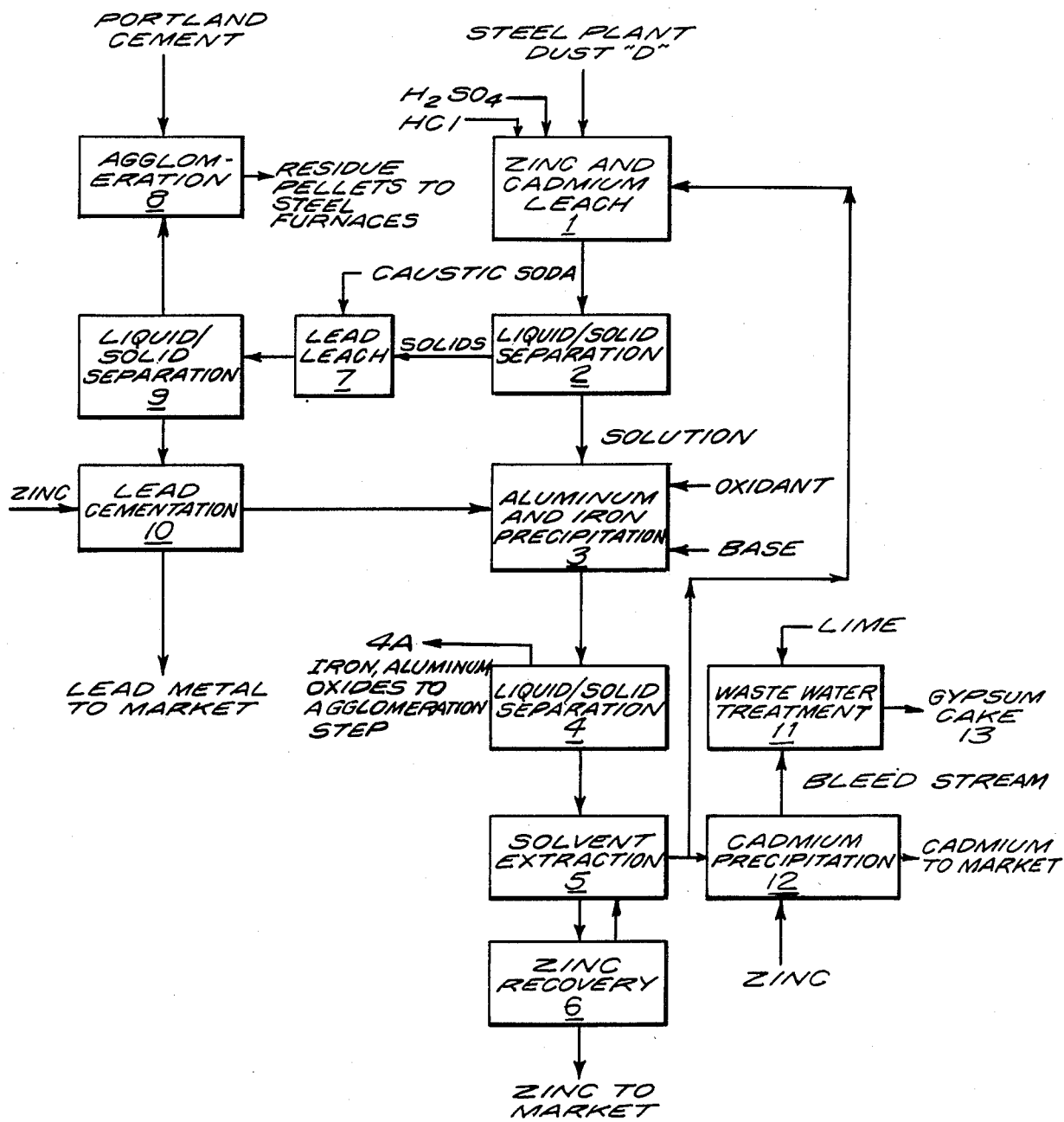

PROCESS FOR METAL RECOVERY FROM STEEL PLANT DUST

This invention relates to the hydrometallurgical treatment of steel plant dusts and, in particular, to the dusts containing iron, lead, and zinc values and at least one of cadmium, aluminum, calcium, and chlorides or fluorides of sodium, potassium, or magnesium as impurities.

BACKGROUND OF THE INVENTION

During melting and refining of steel, the gas leaving the furnace carries a substantial amount of fine dust particles. To protect the atmosphere, these particles are removed in cyclones, scrubbers, and other similar devices. The dust particles are made up of two types of materials. Firstly, it consists of fine particles charged to the furnace such as those of iron oxides, calcium oxide, and silica, which are mechanically carried away by the gas. Secondly, it consists of oxide particles of nonferrous metals such as zinc and lead, which evaporate at the high temperatures of the steel bath and later condense and oxidize in the flue. The amounts of these nonferrous metal oxides in the dust increase as the dust is repeatedly recycled or as more scrap containing these metals are charged into the furnace.

The dust can be repeatedly recycled only for a limited number of cycles. With each recycle, the amount of dust to be collected increases due to larger proportion of the very fine dust particles in the feed. The feeding of such fine particles of low bulk density becomes increasingly difficult. Furthermore, as the amount of recycled dust increases, the energy requirement for reducing and melting iron and other metals from the dust increases.

Also, with repeated recycling, the nonferrous metal content of the dust increases to the point where their return to the steel bath adversely affects the steel melting operation. As oxides present in the slag, they attack the refractory lining of the furnace. In reduced form, these metals enter the molten steel at concentrations higher than permissible to meet specifications for proper mechanical and physical properties of the steel. At this point, the dust has to be removed from the system. Traditionally, this dust has been considered a waste material and disposed of in landfills.

This disposal method is becoming more expensive, not only because of increasing land and transportation costs but also because of increasingly stringent environmental protection regulations. Since the dust particles are very fine, they are likely to become airborne unless they are agglomerated to some extent or kept covered. Furthermore, the chemical nature of these dust particles are such that they classify as hazardous waste, based on the EP toxicity test prescribed by the United States Environmental Protection Agency. As detailed in the article entitled "Characterization of Steelmaking Dusts from Electric Arc Furnace", *United States Bureau of Mines Report of Investigation No.* 8750 (1983) by S. L. Law et al., the toxicity is related to the presence of lead, cadmium, and sometimes chromium.

In view of the above, there has been an increasing interest in developing processes that will permit removal and recovery of nonferrous metals such as zinc, lead, and cadmium from the steel plant dusts. The dust, depleted of these metals, can be recycled back to the steel furnace for recovery of iron or can be stored as a nontoxic waste. Since the tonnage of this material is substantial (about 500,000 tons was produced in 1979 from U.S. electric furnace operations only, according to the aforementioned article), it represents an important source of zinc, lead, and iron metals.

STATE-OF-THE-ART AND SHORTCOMINGS OF THE EXISTING PROCESSES

Because of increasing awareness for environmental concerns in the 1960s, attempts were made to develop processes for recovery of zinc and lead from the steel plant dusts. At that time, pyrometallurgical processes were popular in primary zinc and lead industries, and therefore, it was not uncommon to attempt to use similar processes to treat the steel plant dust. Basically, the processes were variations of the commercial Waelz Process. In essence, the dust is partly reduced at high temperatures to volatilize zinc and lead metals, which are then oxidized and condensed as mixed oxides. A variety of equipment have been suggested to perform the actual operations of reduction, oxidation, and condensation, as detailed in numerous U.S. patents listed below.

| U.S. Pat. No. | Date | Inventor(s) |
|---|---|---|
| 3,262,771 | 7/1966 | Ban |
| 3,403,018 | 9/1968 | Thom |
| 3,754,890 | 8/1973 | Fitch |
| 3,756,804 | 9/1973 | Stevenson |
| 3,770,416 | 11/1973 | Goksel |
| 3,850,613 | 11/1974 | Allen |
| 4,396,423 | 8/1983 | Stephens, et al. |
| 4,396,424 | 8/1983 | Yatsunami, et al. |

None of these processes, insofar as it is known, have been implemented on a commercial scale. This is chiefly because of high capital and operating costs involved with high temperature ($\sim 1,200°$ C.) operations that not only need expensive energy but also require elaborate gas handling and cleaning systems to reduce the atmospheric pollution. The presence of chlorine and fluorine, generally as chlorides and fluorides of sodium, potassium or magnesium, presents severe materials of construction problem. Another major shortcoming of the pyrometallurgical processes is that both lead and zinc are collected together in one intermediate product that needs considerable further processing to separate the two metals.

As an alternative, hydrometallurgical processes have been investigated, particularly after the escalating energy costs experienced in the early 1970s. It is worth noting that about 90 percent of the primary zinc is now produced by a hydrometallurgical process.

One hydrometallurgical method, disclosed in U.S. Pat. No. 3,849,121 granted to Burrows, recommends use of ammonium chloride as a lixiviant. Another process, disclosed in U.S. Pat. No. 4,071,357 granted to Peters, recommends use of ammonia and carbon dioxide gases. Use of strong caustic as a lixiviant is suggested in European Pat. No. 0040659 granted to Pooley et al. These alkaline leaching processes suffer from three common shortcomings: (1) The solutions generated are not compatible with existing zinc plant operations which all treat zinc sulfate solutions, (2) lead is also dissolved in these processes along with the zinc, and (3) the reagents are expensive.

Acid leaching of the steel plant dust would overcome some of these shortcomings. An article by D. Pearson entitled "Recovery of Zinc from Metallurgical Dusts and Fumes", Chapter 14, of the publication *Process and Fundamental Considerations of Selected Hydrometallurgical Systems,* M. C. Kuhn, Editor, Society of Mining Engineers of AIME (1981, pp. 43–53) describes work performed at Warren Springs Laboratory in which sulfuric acid was used to dissolve the zinc from electric arc furnace dusts. While zinc recovery of about 80 percent was obtained, iron dissolution was extensive, about 20 to 22 g/L, indicating high acid consumptions. An even more serious problem was the separation of residual solids from the solution.

It would, therefore, be desirable to provide a process for the recovery of zinc and lead from steel plant dusts in a hydrometallurgical system that does not present a difficult solid/liquid separation problem. It would be further desirable that the residue be in a form that can be recycled to the steel plant for its iron values or stored as a nontoxic waste.

OBJECTS OF THE INVENTION

It is thus an object of this invention to provide a process for the removal of nonferrous metal values, such as zinc and lead, from steel plant dusts.

Another object is to provide a process for the recycle of iron to the steel furnace.

These and other objects will more clearly appear when taken in conjunction with the following disclosure, the appended claims, and the accompanying drawing.

SUMMARY OF THE INVENTION

A schematic flow diagram of the process is shown in the drawing. The process is based on treating the finely divided iron-containing waste materials in a mixed lixiviant system comprised of two common acids, sulfuric acid and hydrochloric acid. By employing the treatment performed in accordance with the process conditions recommended in co-pending patent application Ser. No. 696,978 filed 1-31-85, most of the zinc is dissolved in the solution with very little dissolution of iron. Lead is almost completely rejected into the residual solids phase. Solid/liquid separation can be easily accomplished using thickeners and/or filters. Commercially available flocculants, such as the flocculant identified by the trademark Dow MG-200, works effectively.

The leaching process is versatile in that it can treat a variety of feed materials containing a wide range of zinc and lead values and impurities such as chloride and fluoride salts of sodium, potassium, magnesium, etc. that pose problems in other processing schemes. The composition of the lixiviant, which for the most part is a recycle stream (see the flow diagram), can vary considerably, but the amount of sulfuric acid added should be more than the stoichiometric requirement to sulfate all the lead and calcium present in the feed. The amount of hydrochloric acid added has to be enough to result in a pH of about 3. Although the leaching can be performed at ambient temperature, a higher temperature, up to the boiling point, is preferred, e.g. about 30° to 90° C.

The filtrate from the solid/liquid separation step is oxidized and neutralized to reject iron and aluminum. The filtrate containing zinc and impurities, such as cadmium, sodium, potassium, and magnesium, is treated in a solvent extraction circuit to recover zinc. From the raffinate, cadmium is recovered by known methods such as zinc dust cementation.

The residue from the mixed lixiviant leaching step contains practically all the lead and most of the iron present in the feed. A caustic solution is used to dissolve the lead values selectively, while rejecting iron as hematite residue. After the liquid/solid separation step, the sodium plumbate solution is treated with zinc dust to cement the lead out. The filtrate is used in the process for neutralization, as shown in the FIGURE.

The hematite residue from the lead leaching step is mixed with iron precipitate formed during the neutralization step and agglomerated as pellets using Portland cement. These pellets can be charged into the steel furnace for recovery of iron or stored as nontoxic waste. Co-pending patent application Ser. No. 696,981 filed 1-31-85 provides details for the agglomeration process.

A bleed stream is provided for control of impurities, as shown in the drawing. Lime is used for this purpose.

DETAILS OF THE INVENTION

The invention is applicable to steel dust, flue dust, etc., containing metal values in the following ranges:
  About 1% to 50% Fe
  About 0.5% to 20% Pb
  About 1% to 40% Zn
  Up to About 8% Al
  Up to About 2% Na
  Up to About 7% Cd
  Up to About 20% Cl
  Up to About 5% F
and the balance essentially oxygen associated with the above metals and insoluble oxides such as CaO, $SiO_2$, $MnO_2$, etc.

Generally, the dust contains Fe, Pb, Zn, Al, and Cd, and it is the elements Pb, Zn, and Cd that present the major problem of disposal because of their inherent toxicity.

By using a sulfuric acid-hydrochloric acid mixture, the following objectives are achieved:

1. Zinc, cadmium, chloride, and fluoride salts are substantially completely dissolved with complete rejection of lead.

2. The surface of the iron oxide particles are partially attacked, thereby promoting the formation of new surfaces to which long chain flocculants such as polyacrylamides can be attached for coagulation purposes. Flocculation and settling are extremely effective during liquid/solid separation. Straight sulfuric acid leaching is not desirable in that it produces a residue that is very difficult to separate from the liquid phase. Likewise, straight hydrochloric acid leaching is to be avoided in that it solubilizes nearly all of the iron and most of the lead as well, thus resulting in a complex iron/zinc/lead separation problem. A mixed lixiviant, on the other hand, will provide the $SO_4$ ions for the formation of $PbSO_4$, while solubilizing zinc, cadmium, aluminum, etc.

3. Partial dissolution of aluminum is advantageous since it provides aluminum ions for the precipitation of fluoride ions as $AlF_3$ initially present in the steel plant or other flue dust.

4. The mixed lixiviant enables the use of a chloride containing oxidant in the iron oxidation/precipitation stage. This oxidant can easily be produced in situ electrolytically in the process by carrying out part of the zinc recovery process step in the chloride phase which produces Zn metal and chlorine gas which is useful as an oxidant within the system.

Various methods may be employed in recovering the metal values. Thus, in the case of zinc, the solvent D2EHPA [di-(2-ethylhexyl) phosphoric acid] may be employed for selectively extracting zinc ions from impure aqueous solutions to produce relatively pure zinc. Some of the zinc recovered in the form of a powder may then be used for cementing lead from lead-rich solutions obtained as a byproduct of the invention. For example, the lead residue may be dissolved in a caustic solution, as shown in the flow sheet.

The recovered zinc can also be used for the cementation of cadmium. Although the cadmium is present in small quantities in the steel dust, the cadmium concentration is enhanced considerably by treating only a small bleed from the leach solution that is regenerated in the solvent extraction unit operation step.

Since the final residue will be high in iron, it is recycled to the steel plant furnaces in the form of agglomerates by using Portland cement added to the residue in an amount (e.g., 1% by weight) sufficient to bind the residue in the form of easy-to-handle agglomerates.

The zinc recovery, as stated above, can also be achieved electrochemically. Since zinc ions present in the loaded organic phase of the solvent extraction (SX) section can be transferred to essentially any electrolyte with free hydrogen ions, various electrolytes can be used (for example, electrolytes based on the sulfate ion, the chloride ion, etc.). Electrowinning from zinc chloride solution is advantageous because of a substantial reduction in power consumption. Zinc electrolytes may also be used for electrogalvanizing, for the production of zinc powder, or to make pure zinc chemicals (e.g., zinc chloride, zinc sulfate, etc.).

As illustrative of the invention, the following example is given, reference being made to the flowsheet.

Referring to the flowsheet, steel plant dust "D" is subjected to leaching, the dust "D" having the following composition:

Fe: 28%
Pb: 3%
Zn: 26%
Al: 0.6%
Cd: 0.04%
Chlorine: 3%
Fluorine: 1%

The balance is oxygen combined with the above named metals as oxides, as well as other insoluble oxides such as CaO, SiO$_2$, etc.

The mixed acid employed in dissolving zinc and cadmium and precipitating the lead contains about 5 to 25 grams per liter (g/L) HCl and about 10 to 50 g/L H$_2$SO$_4$. The amount of H$_2$SO$_4$ should be enough to sulfate all the lead and calcium and provide an excess of about 10 g/L sulfate. The amount of HCl added should be enough to maintain the pH from about 1.5 and 2.5. The amount of dust added to the acid corresponds to a pulp density of about 20 percent, corresponding to an increase in zinc concentration of about 40 g/L in a recirculating system as shown in the flow sheet. The pulp density may range from about 5% to 40% by weight.

The leach solution is heated to about 90° C. and the leaching (Step 1) conducted for about 1 to 4 hours, wherein substantially all of the acid-soluble metal values including chlorides and fluorides are dissolved, except for lead and calcium which report to the residue as sulfate together with most of the iron oxide, silica, etc.

Following completion of the leaching, the slurry is subjected to liquid/solid separation Step 2, the solution or filtrate being sent to Step 3 for the separation of dissolved iron and aluminum. This is achieved by oxidizing the solution to raise the oxidation voltage by bubbling chlorine gas therethrough, and also raising the pH to at least about 3 by the addition of a base (e.g., sodium hydroxide, lime).

Following precipitation of iron and aluminum as oxides (the terms oxides and hydroxides are used interchangeably), the precipitate is removed at liquid/solid separation Step 4 to provide solids 4A and a clean filtrate, which is sent to solvent extraction 5. The filtrate is mixed with an organic solvent containing di-2-ethylhexyl phosphoric acid (also called D2EHPA) and the zinc extracted from the aqueous solution using a series of solvent extraction stages with the raffinate returning to the leaching step and a small bleed stream going to cadmium recovery Step 12 to be described later.

The organic solvent loaded with zinc is stripped in a series of stripping stages using a sulfuric acid solution containing about 50 to 150 g/L H$_2$SO$_4$, the volume ratio of organic to the acid solution being such as to provide a loaded strip solution containing about 50 to 150 g/L zinc suitable for electrolysis at Step 6.

The lead sulfate precipitate and other residue obtained in the liquid/solid separation Step 2 are sent to lead leach Step 7, where the precipitate is subjected to a sodium hydroxide leach to form a sodium plumbate solution. The leach solution employed contains about 200 to 400 g/L NaOH. Complete and selective dissolution of lead is obtained in about 1 to 4 hours at a temperature of about 100° C.

The resultant leach is sent to liquid/solid separation Step 9 where insolubles containing mostly iron, calcium, and silicon oxides with hardly any sulfur are separated and agglomerated with Portland cement at Step 8. The agglomerates can be mixed with iron ore fed to the steel furnaces. The solution containing dissolved lead is treated with powdered zinc to cement out the lead at Step 10, the resulting filtrate containing zinc going to Step 3 to join the filtrate from the zinc-cadmium leach. The cadmium is precipitated from solution by using zinc powder at Step 12, the waste water going to Step 11 from which a gypsum cake residue 13 is produced.

The raffinate from the solvent extraction is recycled for leaching, and a bleed stream is treated as described previously for the recovery of contained cadmium. The bleed stream prevents buildup of undesirable impurities.

A preferred extractant for zinc is di-(2-ethylhexyl) phosphoric acid, commonly known as D2EHPA. Generally, this extractant is used for zinc sulfate solutions, as described in U.S. Pat. No. 4,401,531. However, the extractant can selectively extract zinc from chloride solutions also as described in U.S. Pat. No. 4,288,304. Other possible extractants include di-2-ethyl-phosphonic acid (HEH/EHP), di-(2,4,4-tri-methylpentyl) phosphinic acid and tri-butyl phosphate, commonly known as TBP.

Typical water-immiscible solvents for the extractants include kerosene, aliphatic and aromatic organic solvents. The concentration of the extractant in the organic may range from about 5 percent to 40 percent by volume.

The loaded organic can be stripped with an acid selected from the group consisting of hydrochloric acid and sulfuric acid, to produce pure zinc solutions. Electrowinning of pure zinc from zinc chloride solutions is a known art, as described in the article entitled "Zinc Electrowinning from Chloride Electrolyte" by D. J. Mackinnon et al., *Mining Engineering*, April 1982 (pp. 404–414) which is incorporated herein by reference.

As will be clearly apparent from the foregoing, a novel combination of operational steps is provided for the treatment of steel plant dust, wherein the dust is capable of being treated to produce metal values and solution tailings and residues which can be safely disposed in the environment as nonhazardous wastes.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A process for the hydrometallurgical treatment of steel plant dust containing iron, lead, zinc, and at least one of cadmium, aluminum, calcium, chlorides and fluorides of sodium, potassium and magnesium as impurities which comprises, mixing a charge of said dust with an acid solution containing a mixture of hydrochloric acid and sulfuric acid, the amount of hydrochloric acid being at least stoichiometrically sufficient to react with and form a solution of at least one of zinc and cadmium, and maintain a pH in the range of about 1.5 to about 2.5, the amount of sulfuric acid being at least stoichiometrically sufficient to react with lead and form a precipitate of lead sulfate, leaching said dust with said solution at a temperature ranging from ambient up to the boiling point, subjecting said solution of solid/liquid separation to remove the lead sulfate precipitate and provide a filtrate containing iron and zinc and at least one of aluminum and cadmium, oxidizing said filtrate and adding a neutralizing agent to raise the pH to a level selective to the precipitation of iron and aluminum present, separating the precipitate from said filtrate containing zinc, and selectively recovering zinc from said filtrate.

2. A process for the hydrometallurgical treatment of steel plant dust containing iron, lead, zinc, and at least one of cadmium, aluminum, calcium and chlorides and fluorides of sodium, potassium and magnesium as impurities which comprises, providing steel plant dust containing
about 1% to 50% Fe
about 0.5% to 20% Pb
about 1% to 40% Zn
up to about 8% Al
up to about 2% Na
up to about 7% Cd
up to about 20% Cl
up to about 5% F and the balance essentially oxygen associated with the above metals and insoluble oxides of CaO, $SiO_2$, and $MnO_2$, mixing a charge of said dust with an acid leaching solution containing a mixture of hydrochloric acid and sulfuric acid, the amount of hydrochloric acid being at least stoichiometrically sufficient to react with and form a solution of zinc and cadmium and maintain the pH in the range of about 1.5 to about 2.5, the amount of sulfuric acid being at least stoichiometrically sufficient to react with lead and form a precipitate of lead sulfate, leaching said dust with said solution at a temperature in the range of about 30° C. to 90° C., subjecting said solution to solid/liquid separation to remove the lead sulfate precipitate and provide a filtrate containing iron, aluminum, zinc and cadmium, selectively dissolving the lead sulfate with a solution of caustic soda and recovering lead from said solution, oxidizing said iron-containing filtrate and adding a neutralizing agent to raise the pH to a level selective to the precipitation of iron and aluminum as oxides, separating the precipitated iron and aluminum oxides from said filtrate containing zinc and cadmium, agglomerating said precipitate for use as recycled feed to steel furnaces, selectively recovering zinc from said filtrate by solvent extraction using an organic solvent and providing a raffinate containing cadmium filtrate, recovering cadmium from the raffinate, stripping said zinc from the organic solvent with an aqueous acid solution, and recovering said zinc from said solution.

3. The process of claim 2, wherein the solvent is a water immiscible liquid selected from the group consisting of kerosene, aliphatic and aromatic organic solvents containing an extractant selected from the group consisting of di-(2-ethylhexyl) phosphoric acid, di-2-ethylphosphonic acid, di-(2,4,4-trimethyl-pentyl) phosphinic acid and tri-butyl phosphate.

4. The process of claim 2, wherein the acid leaching solution contains about 5 to 25 g/L HCl and about 10 to 50 g/L $H_2SO_4$.

5. The process of claim 3, wherein the amount of extractant in the organic solvent ranges from about 5% to 40% by volume.

6. The process of claim 2, wherein the amount of steel plant dust mixed with the leaching solution ranges from about 5% to 40% by weight of the mixture.

7. The process of claim 3, wherein the acid stripping solution is selected from the group consisting of HCl and $H_2SO_4$.

8. The process of claim 7, wherein the stripping solution consists essentially of sulfuric acid ranging from about 50 to 100 g/L the volume ratio of the organic solvent to the acid solution being such as to provide a loaded strip solution containing about 50 to 150 g/L zinc for use in the electrolytic recovery thereof.

9. The process of claim 8, wherein the zinc is recovered from the stripping solution by electrolysis.

* * * * *